Patented Feb. 22, 1944

2,342,370

UNITED STATES PATENT OFFICE 2,342,370

POLYAMIDE

Henry J. Richter, Wilmington, Del., assignor to E. I. du Pont de Nemours & Company, Wilmington, Del., a corporation of Delaware No Drawing. Application September 10, 1941, Serial No. 410,346

8 Claims. (Cl. 260—33)

This invention relates to new compositions of matter and more particularly to improved plasticized superpolyamides.

The polyamides from which the present improved compositions are made are the synthetic linear polyamides of the general type disclosed in U. S. Patents 2,071,250, 2,071,253 and 2,130,948. The polymers there described are high molecular weight products, usually of intrinsic viscosity of at least 0.4, which can be cold drawn into strong, continuous, pliable textile fibers showing by X-ray examination orientation along the fiber axis. These polyamides, generally speaking, comprise the reaction product of a polyamide-forming composition in which the molecules are bifunctional and contain two amide-forming groups, each of which is complementary to an amide-forming group in other molecules in said composition.

The polyamides as defined above or as otherwise identified hereinafter can be obtained, for example, by self-polymerization of monoaminomonocarboxylic acids, or by reacting a diamine with a dibasic carboxylic acid in substantially equimolecular amounts. Likewise, interpolyamides can be obtained by reacting two or more diamines with one or more dibasic carboxylic acids, or by reacting two or more dibasic carboxylic acids with one or more diamines or by polymerizing a mixture of two or more monoaminomonocarboxylic acids, or of one or more of these amino acids with at least one diamine and at least one dibasic carboxylic acid. These linear polyamides include also polymers obtained by admixture of other linear polymer-forming reactants, as for instance glycol-dibasic acid mixtures in the case of polyester-amides, with the mentioned polyamide-forming reactants. In either instance the amide group is an integral part of the main chain of atoms in which the average number of atoms separating the amide groups is preferably at least two. On hydrolysis with hydrochloric acid the amino acid polymers yield the amino acid hydrochloride, and the diamine-dibasic acid polymers yield the diamine hydrochloride and the dibasic carboxylic acid.

For many uses, such as in transparent wrapping foil and in coatings for fabrics, it is desirable that the polyamides be highly pliable and resilient, and that these properties be maintained over a wide temperature range. On the other hand, the polyamide compositions should not soften or become tacky at room temperature or at temperatures somewhat above. Acceptable compositions must also be resistant to failure on repeated flexing at both normal and subnormal temperatures.

Among the plasticizing agents previously proposed for the polyamides are sulfonamides and various other compounds which are plasticizers of the solvent type since they are compatible in nearly all proportions. Polyamides containing a relatively high percentage of these agents are very soft and pliable, but this pliability is lost to a point of extreme brittleness at low temperatures. Polyamides plasticized with relatively high percentages of these materials are in addition generally tacky and low melting. Although certain of the desired properties can be obtained in the polyamides by selection from those agents known to be effective, no compounds have been known hitherto which will contribute all the desired properties.

This invention has as an object the production of improved polyamide compositions. A further object is the preparation of improved plasticized polyamide compositions and articles made therefrom which are highly pliable, with retention of pliability over a wide temperature range, and which do not become tacky at moderately elevated temperature. Other objects will appear hereinafter.

These objects are accomplished by incorporating in the polyamide a mixture of plasticizing substances, one of which is a solvent plasticizer and the other of which is a compound which consists of a neutral carboxylic acid ester of a hydroxy acid ester, and which will be more fully described hereinafter.

This neutral ester which, with the solvent plasticizer, is an essential component of the present plasticizing mixture, is a completely esterified ester of a carboxylic acid, in which ester at least one of the alcohol residues is an aliphatic carboalkoxy alcohol wherein the organic radical connecting the alcoholic hydroxyl and the carboalkoxy group contains not more than 6 carbon atoms. The esters of this kind most advantageously used in the present invention are those in which the carboxylic acid is a dicarboxylic acid. These compounds are preferably those of the formula $$R_1OCORCOOR_2COOR_3$$

where R is a divalent hydrocarbon radical, $R_2$ is a divalent hydrocarbon radical of not more than 6 carbon atoms, and $R_1$ and $R_3$ are substituents selected from the group consisting of monovalent hydrocarbon radicals and monovalent hydrocarbon radicals bearing ether groups. An example of these esters is the monobutyl phthalate ester of butyl glycolate which is butyl carbobutoxymethyl phthalate of formula $$C_4H_9OCOC_6H_4COOCH_2COOC_4H_9$$

Another type of ester useful in the present compositions is that of the formula $$R_1OCOR_4OCORCOOR_2COOR_3$$

in which the indicated radicals are as given above and in which $R_4$ is defined as given for $R_2$. An example of a compound of this kind is di-(carboisobutoxymethyl) maleate, $$(CH_3)_2CHCH_2OCOCH_2OCOCH= \\ CHCOOCH_2COOCH_2CH(CH_3)_2$$

A still further type of the previously defined esters is that represented by the formula $R_5COOR_2COOR_1$ where $R_1$ and $R_2$ are as defined above and $R_5$ is a monovalent hydrocarbon radical. A compound of this kind is carboethoxymethyl palmitate $CH_3(CH_2)_{14}COOCH_2COOC_2H_5$. The esters represented by the several formulae given above can be prepared by the usual methods employed in the preparation of hydroxy acids.

The solvent type plasticizers used in conjunction with the neutral esters defined above include a large number of readily available sulfonamides and other compounds which are known to be useful as plasticizers for the polyamides. The unusual balance of properties previously referred to which are obtained in the polyamide compositions by the present mixture of ester and solvent type plasticizer are not obtained by replacing the esters defined above with other neutral esters. The use alone of either of the two agents which form the present plasticizing mixtures is also ineffective in accomplishing the objects of this invention.

The total quantity of the plasticizing mixture and the proportion of the neutral carboxylic acid ester of a hydroxy acid ester contained in the mixture will vary depending upon the properties desired in the final product. For most purposes the total quantity of the plasticizer ranges from 10% to 150% by weight of the polyamide, and the quantity of the carboxylic ester ranges from about 25% to 100% of the solvent type plasticizer used. These proportions, however, can be as low as 10% or as high as 150% with noticeable improvement in the properties of the polyamide. A convenient method for incorporating these materials in the polyamides consists in dissolving the blend of plasticizers and the polyamide in a mutual solvent. Such solutions can be used to make filaments, films, rods, and the like by evaporative or coagulative methods. Lower fatty acids, for example formic acid, are useful solvents for this purpose. Mixtures of chloroform and methanol, or ethanol and water are especially useful solvents for the polyamide interpolymers. These plasticizer blends can also be incorporated with the polyamides by a melt blending technique, especially if blended rapidly.

The invention is described more specifically in the following examples in which parts are by weight.

Example I

Ten parts of an interpolyamide, which is obtained by polymerizing 60 parts of hexamethylenediammonium adipate and 40 parts of caprolactam and which melts at 170°–175° C. and has a melt viscosity of 2,200 poises at 250° C., is dissolved in 55 parts of a mixture of equal volumes of chloroform and methanol by stirring at 60° C. for two hours. Six parts of amylbenzenesulfonamide and 4 parts of butyl carbobutoxymethyl phthalate are now added to the solution with stirring. The solution is cooled to room temperature and a portion poured onto a glass plate. By means of a leveling blade the solution is spread to an even layer and the solvent allowed to evaporate at room temperature. Final traces of solvent are removed from the film by heating at 65° C. for 15 hours.

As previously indicated, the improved products of this invention are not obtained by replacing the non-solvent carboxylic ester plasticizer with other types of readily available plasticizers or by using separately the plasticizers contained in the mixture of plasticizers used in the practice of this invention. Although the sulfonamides and other solvent type plasticizers yield valuable plasticized polyamide compositions useful for many purposes, certain products, particularly those in which these compositions are in the form of a film, possess to a markedly inferior degree the properties possessed by the present compositions which especially adapt them to the manufacture of wrapping foils, coated fabrics and other film products. Thus for comparison a second film is prepared in exactly the same manner from 10 parts of the same polymer and 10 parts of amylbenzenesulfonamide. Both films are clear, soft, and pliable at room temperature. On testing at 0° F. the film containing butyl carbobutoxymethyl phthalate shows no crack when struck with hammer #1 of a cold crack machine (impact testing machine of U. S. Patent 2,218,146), while the film containing only amylbenzenesulfonamide develops a 3 inch crack. A polyamide plasticized with only the neutral ester component is likewise definitely inferior to that obtained by using the mixture of plasticizers of this invention as shown by the following:

A plasticized polyamide composition similar to that of Example I was tested for pliability by forming bags from the composition and dropping the bags filled with beans from a fixed height and noting the number of falls before breaking. These bags withstood about four times the number of falls that were obtained with bags tested in the same manner but made from a composition differing only in that the plasticizer consisted solely of 20% of the ester plasticizer.

Example II

The polyamide used in this example melts at 155° C., has an intrinsic viscosity of 1.05 and is prepared from hexamethylenediammonium adipate, epsilon-aminocaproic acid, and 12-aminostearic acid in a 45:25:30 ratio. One hundred parts of this interpolyamide is dissolved in 495 parts of a mixture of equal volumes of chloroform and methanol by warming and stirring. To this solution are added with stirring 32.4 parts of amylbenzenesulfonamide and 21.6 parts of butyl carbobutoxymethyl phthalate. The solution is cooled to room temperature and a film cast as described in Example I. It is stripped from the glass plate and final traces of solvent removed from the film by aging at 65° C. for 15 hours. The film thus prepared melts at 128° C., has an elongation of 478%, and a tensile strength of 2350 pounds per square inch based on the original dimensions. The film is not cracked when dealt a severe blow at temperatures as low as —10° F.

*Example III*

Ten parts of the interpolymer described in Example I is dissolved in 44 parts of a mixture of chloroform and methanol (3 volumes of chloroform and 2 of methanol) by stirring at 60° C. for two hours. Five parts of amylbenzenesulfonamide and 5 parts of 2-methoxyethyl[carbo(2-methoxyethoxy)]-methyl phthalate are added to the solution with stirring. The solution is cooled to room temperature and a film prepared as in Example II. The film is stripped from the plate and final traces of solvent are removed from the film by heating at 65° C. for four hours. An extremely clear, soft, dry film is obtained which does not exude on cold drawing. The film thus prepared melts at 135–139° C., has an elongation of 200% and a tensile value of 1070 pounds per square inch based on the original dimensions. The film is clear and dry. For comparison a second film is prepared in exactly the same manner from 10 parts of the same interpolymer, 5 parts of amylbenzenesulfonamide and 5 parts of di-(2-methoxyethyl) phthalate. This film is clear but has an oily surface caused by exudation of the plasticizer.

The mixtures of plasticizers disclosed herein can be used with any of the polyamides of the kinds described in the above mentioned patents which are subject to improvement by the use of plasticizing agents. Because of their greater inherent flexibility it is preferred to use the interpolyamides obtained from a mixture of at least two different polyamide-forming compositions rather than the straight polyamides. This mixture can contain two or more different diamines and one or more dibasic carboxylic acid or vice versa, or can consist of two different monoamino-monocarboxylic acids, or of a mixture of at least one amino acid with at least one diamine and at least one dibasic carboxylic acid. Other linear polymer-forming reactants can also be included in the composition from which the polyamide is made. It is to be understood that reference herein to the amino acids, dibasic carboxylic acids, and diamines is intended to include the equivalent amide-forming derivatives of the amino acids, the dicarboxylic acids, and the diamines. Amide-forming derivatives of the amino acids include the esters, anhydrides, amides, lactams, acid halides, N-formyl derivatives, carbamates, and nitriles in the presence of water. Amide-forming derivatives of the dibasic carboxylic acids comprise the mono- and di-esters, the anhydrides, the mono- and di-amides, acid halides, and the following compounds in the presence of water: Nitriles, cyanocarboxylic acids, cyanoamides, and cyclic imides. Amide-forming derivatives of the diamines include the carbamates, N-formyl derivatives and the N,N'-diformyl derivatives.

Examples of particular polyamides that may be mentioned as useful in the practice of this invention are polyhexamethylene adipamide, polyhexamethylene sebacamide, polydecamethylene adipamide, polydecamethylene sebacamide, polytetramethylene adipamide, the polyamides obtained from either 1,4-xylylene diamine or meta-phenylenediamine with either adipic or sebacic acids, the polyamides obtained from 6-amino-caproic acid and 12-aminostearic acid, the interpolyamides obtained from mixtures of hexamethylenediamine, adipic acid and 6-aminocaproic acid, the interpolyamides obtained from mixtures of hexamethylenediamine, adipic acid, sebacic acid and 6-aminocaproic acid, etc.

Additional examples of the neutral carboxylic acid esters are:

Ethyl carboethoxymethyl phthalate,

$C_2H_5OCOC_6H_4COOCH_2COOC_2H_5$

Isobutyl carboisobutoxymethyl phthalate,

$(CH_3)_2CHCH_2OCOC_6H_4COOCH_2$
$COOCH_2CH(CH_3)_2$

Di-(carboisobutoxymethyl) phthalate,

$(CH_3)_2CHCH_2OCOCH_2OCOC_6H_4$
$COOCH_2COOCH_2CH(CH_3)_2$

Butyl carbobutoxymethyl adipate,

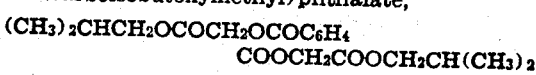
$C_4H_9OCO(CH_2)_4COOCH_2COOC_4H_9$

Ethyl carboethoxymethyl sebacate,

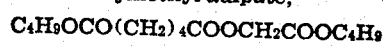
$C_2H_5OCO(CH_2)_8COOCH_2COOC_2H_5$

Di-(carboisobutoxymethyl) adipate,

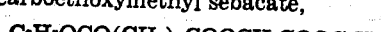
$(CH_3)_2CHCH_2OCOCH_2OCO(CH_2)_4$
$COOCH_2COOCH_2CH(CH_3)_2$

Di-[carbo-(2-methoxyethoxy)methyl]sebacate,

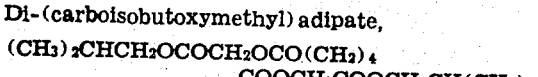
$CH_3OCH_2CH_2OCOCH_2OCO(CH_2)_8$
$COOCH_2COOCH_2CH_2OCH_3$

Isobutyl carboisobutoxymethyl maleate,

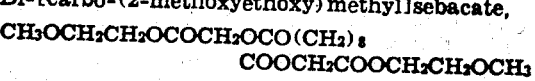
$(CH_3)_2CHCH_2OCOCH=CHCOOCH_2$
$COOCH_2CH(CH_3)_2$

Di-(carboethoxymethyl) maleate,

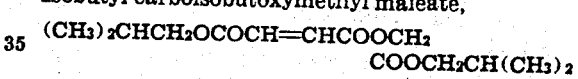
$C_2H_5OCOCH_2OCOCH=CHCOOCH_2COOC_2H_5$

Amyl carboamyloxymethyl oxalate,

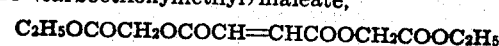
$C_5H_{11}OCOCOOCH_2COOC_5H_{11}$

Di-(carbomethoxymethyl) oxalate,

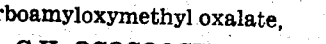
$CH_3OCOCH_2OCOCOOCH_2COOCH_3$

2 - methoxyethyl[carbo - (2 - methoxyethoxy) methyl]succinate,

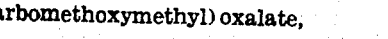
$CH_3OCH_2CH_2OCO(CH_2)_2COOCH_2$
$COOCH_2CH_2OCH_3$

Cyclohexyl carbocyclohexyloxymethyl azelate,

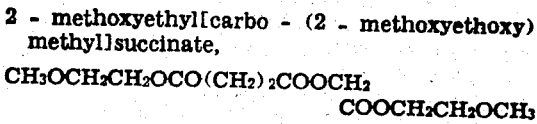
$C_6H_{11}OCO(CH_2)_7COOCH_2COOC_6H_{11}$

Di-(carbopropoxymethyl) azelate,

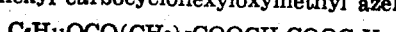
$C_3H_7OCOCH_2OCO(CH_2)_7COOCH_2COOC_3H_7$

Methyl carbobutoxymethyl malonate,

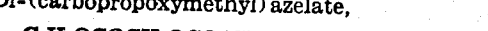
$CH_3OCOCH_2COOCH_2COOC_4H_9$

Di-(carbobenzoxymethyl) malonate,

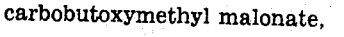
$C_6H_5CH_2OCOCH_2OCOCH_2COOCH_2COOCH_2C_6H_5$

Carboethoxymethyl palmitate,

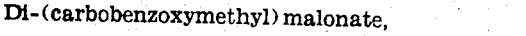
$CH_3(CH_2)_{14}COOCH_2COOC_2H_5$

Carboisobutoxymethyl benzoate,

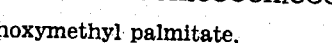
$C_6H_5COOCH_2COOCH_2CH(CH_3)_2$

Carbobutoxymethyl octanoate,

$CH_3(CH_2)_6COOCH_2COOC_4H_9$

Butyl 1-(carbobutoxy)ethyl phthalate,

$C_4H_9OCOC_6H_4COOCHCOOC_4H_9$
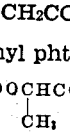
$CH_3$

Isobutyl 1-(carboisobutoxy)ethyl adipate, $$(CH_3)_2CHCH_2OCO(CH_2)_4COOCHCOOCH_2CH(CH_3)_2$$
$$\phantom{(CH_3)_2CHCH_2OCO(CH_2)_4COOC}|\phantom{OCH_2CH(CH_3)_2}$$
$$\phantom{(CH_3)_2CHCH_2OCO(CH_2)_4COO}CH_3$$

Isobutyl-1-(carbobutoxy)propyl phthalate, $$(CH_3)_2CHCH_2OCOC_6H_4COOCH-COOC_4H_9$$
$$\phantom{(CH_3)_2CHCH_2OCOC_6H_4COO}|\phantom{H-COOC_4H_9}$$
$$\phantom{(CH_3)_2CHCH_2OCOC_6H_4COO}C_2H_5$$

Methyl (1-carboethoxy-1-methyl)ethyl phthalate, $$\phantom{CH_3OCOC_6H_4COO}CH_3$$
$$\phantom{CH_3OCOC_6H_4COO}|$$
$$CH_3OCOC_6H_4COOC-COOC_2H_5$$
$$\phantom{CH_3OCOC_6H_4COO}|$$
$$\phantom{CH_3OCOC_6H_4COO}CH_3$$

Ethyl (2-carboethoxy)ethyl phthalate, $$C_2H_5OCOC_6H_4COOCH_2CH_2COOC_2H_5$$

Solvent type plasticizers which can be used instead of those named in the examples for forming the present plasticizing mixtures of non-solvent and solvent plasticizers, include diamylbenzenesulfonamide, N-ethyl amylbenzenesulfonamide, N-diethyl amylbenzenesulfonamide, hexylbenzenesulfonamide, dodecylbenzenesulfonamide, N-cyclohexyl p-toluenesulfonamide, N-di-(n)butyl toluenesulfonamide, N-ethyl toluenesulfonamide, white oil sulfonamide, the lower molecular weight sulfonamideformaldehyde resins, acids having a boiling point at ordinary pressure above 200° C., for example, oleic acid, ricinoleic acid, benzoic acid, o-benzoyl benzoic acid, lauric acid, linoleic acid, citric acid, α-hydroxyisobutyric acid, sebacic acid, 12-hydroxystearic acid and m-chlorobenzoic acid; hydroxyalkyl ethers of a phenol or alkylated phenol, for example, p-tertiary amylphenoxyethanol, di-tertiary amylphenoxyethanol, alpha glycerol diamylphenyl ether, 1,3-di(betahydroxyethoxy)benzene, and N-(hydroxyalkyl)amides of the alkyl ether of a phenolic carboxylic acid, for example, N(β-hydroxyethyl)ortho methoxybenzamide, N(β-hydroxyethyl)ortho methallyloxybenzamide, N(β-hydroxyethyl)para ethoxybenzamide. A valuable embodiment of this invention, not specifically claimed herein since it is the subject matter of application Serial No. 410,347 filed of even date herewith by Gordon T. Vaala, is the use of the above mentioned esters in conjunction with phenols as the solvent type plasticizer. Examples of suitable phenols are 2,2-di-(hydroxyphenyl)-propane, 1,3-di-(hydroxyphenyl)propane, 1,6-di-(hydroxyphenyl)hexane, 2,9-di-(hydroxyphenyl)-decane, 2-methoxyphenyl-2-phenylolpropane, diamylphenol, octylphenol, 2-chloro-4,6-di-tertiary amylphenol, p-cyclohexylphenol, 2,6-dichloro-4-tertiary amylphenol, dibenzylphenol, methyl-10-(hydroxyphenyl)stearate, methyl-10,13-di(hydroxyphenyl)stearate, bis[(hydroxyphenyl)ethoxy]ethane, 2,2'bis-[(hydroxyphenyl)ethoxy]ethyl ether, 10-(hydroxyphenyl)stearonitrile, β,β'-di(hydroxyphenyl)diethyl ether, 2-(4'ethoxyphenyl)2-(hydroxyphenyl)propane, 2-hydroxyethyl-10-(hydroxyphenyl)stearate, 10-(hydroxyphenyl)stearyl-10-(hydroxyphenyl)stearate, 1,1-bis-(hydroxyphenyl)cyclohexane, 1,1-bis-(hydroxyphenyl)heptane and hydroxyphenyl pentane.

Phenolated fatty acid esters, prepared by condensation of a phenol with esters of unsaturated fatty acids or by replacement of a hydroxyl group with a phenylol group are useful solvent plasticizers of the phenolic type. Among the materials which may be phenolated to yield derivatives of this general kind are castor oil, olive oil, cottonseed oil, soya bean oil, peanut oil, methyl oleate, allyl oleate, red oil, linseed oil, corn oil, rapeseed oil, oiticica oil, tung oil, China-wood oil, palm oil and tea seed oil.

The plasticized polyamide compositions of this invention yield films which possess remarkable resistance to failure on repeated flexing at both normal and subnormal temperatures. These polyamide compositions are, furthermore, surprisingly pliable and still hard and dry on the surface. In contrast to most plasticized polyamide films and coated fabrics, the compositions of this invention are highly resistant to the action of steam, a property of paramount importance in the lasting of shoes with fabrics coated with plasticized polyamides.

A large variety of improved polyamide products are obtained from the new compositions disclosed herein. Typical applications are yarns, fabrics, bristles, surgical sutures, fishing leaders, fishlines, dental floss, rods, tubes, films, ribbons, sheets, safety glass interlayers, molded articles, adhesives, electrical insulations for wires, impregnating agents, and coating compositions for cloth, paper, leather, metal, and wood. They are useful for impregnating or coating cloth, followed by calendering or pressing for use as collar interliners. Fabrics coated with the compositions of this invention are especially useful in the fabrication of shoes and upholstery where pliability and resistance to failure on repeated flexing are essential. Valuable products in film form obtained from the present compositions are wrapping foils, leather applications, raincoats, shower curtains, and umbrellas. By reason of the fact that superpolyamide blends of this invention may be melted and thus extruded, they can be formed into tubing or coated directly onto fabrics and metals. The compositions are also useful in the preparation of blown articles such as toys, hollow toiletware, etc. Furthermore, they may be compression molded, for example, blanked or stamped out into shaped articles.

As many apparently widely different embodiments of this invention may be made without departing from the spirit and scope thereof, it is to be understood that I do not limit myself to the specific embodiments thereof except as defined in the appended claims.

I claim:

1. A composition of matter comprising a synthetic linear polyamide plasticized with a mixture which comprises a solvent plasticizer and a non-solvent plasticizer comprising a completely esterified ester of a carboxylic acid, in which ester at least one of the alcohol residues is an aliphatic carboalkoxy alcohol wherein the organic radical connecting the alcoholic hydroxyl and the carboalkoxy group contains not more than 6 carbon atoms, said polyamide being one which on hydrolysis with hydrochloric acid yields a material selected from the group consisting of (a) the hydrochloride of a monoaminomonocarboxylic acid, and (b) a mixture of diamine hydrochloride and a dibasic carboxylic acid.

2. A composition of matter comprising a synthetic linear polyamide plasticized with a mixture comprising a sulfonamide plasticizer and a completely esterified ester of a carboxylic acid, in which ester at least one of the alcohol residues is an aliphatic carboalkoxy alcohol wherein the organic radical connecting the alcoholic hydroxyl and the carboalkoxy group contains not more than 6 carbon atoms, said polyamide being one which on hydrolysis with hydrochloric acid yields a material selected from the group consisting of (a) the hydrochloride of a monoaminomonocarboxylic acid, and (b) a mixture of diamine hydrochloride and a dibasic carboxylic acid.

3. A composition of matter comprising a synthetic linear polyamide plasticized with a mixture comprising a sulfonamide plasticizer and a completely esterified ester of a carboxylic acid of the formula $R_1OCORCOOR_2COOR_3$ in which R is a divalent hydrocarbon radical, $R_2$ is a divalent hydrocarbon radical of not more than 6 carbon atoms, and in which $R_1$ and $R_3$ are substituents selected from the class consisting of monovalent hydrocarbon radicals and monovalent hydrocarbon radicals bearing ether groups, said polyamide being one which on hydrolysis with hydrochloric acid yields a material selected from the group consisting of (a) the hydrochloride of a monoaminomonocarboxylic acid, and (b) a mixture of diamine hydrochloride and a dibasic carboxylic acid.

4. A composition of matter comprising a synthetic linear polyamide plasticized with a mixture comprising a sulfonamide plasticizer and a completely esterified ester of a carboxylic acid of the formula $R_1OCOR_4OCORCOOR_2COOR_3$ in which R, $R_1$ and $R_3$ are as defined in claim 3 and in which $R_2$ and $R_4$ are divalent hydrocarbon radicals of not more than 6 carbon atoms, said polyamide being one which on hydrolysis with hydrochloric acid yields a material selected from the group consisting of (a) the hydrochloride of a monoaminomonocarboxylic acid, and (b) a mixture of diamine hydrochloride and a dibasic carboxylic acid.

5. A composition of matter comprising a synthetic linear polyamide plasticized with a mixture comprising a sulfonamide plasticizer and a completely esterified ester of a carboxylic acid of the formula $R_5COOR_2COOR_1$ in which $R_1$ and $R_2$ are as defined in claim 3 and $R_5$ is a monovalent hydrocarbon radical, said polyamide being one which on hydrolysis with hydrochloric acid yields a material selected from the group consisting of (a) the hydrochloride of a monoaminomonocarboxylic acid, and (b) a mixture of diamine hydrochloride and a dibasic carboxylic acid.

6. The composition of matter set forth in claim 3 in which said sulfonamide plasticizer is amylbenzene sulfonamide and in which said completely esterified ester of a carboxylic acid is butyl carbobutoxymethyl phthalate.

7. The composition of matter set forth in claim 3 in which said sulfonamide plasticizer is amylbenzene sulfonamide and in which said completely esterified ester of a carboxylic acid is 2-methoxyethyl [carbo(2-methoxyethoxy)] methyl phthalate.

8. The composition of matter set forth in claim 3 in which said sulfonamide plasticizer is N-ethyl toluenesulfonamide and in which said completely esterified ester of a carboxylic acid is butyl carbobutoxymethyl phthalate.

HENRY J. RICHTER.